(12) United States Patent
Breuer et al.

(10) Patent No.: US 9,119,135 B2
(45) Date of Patent: Aug. 25, 2015

(54) ACCESSIBILITY OF PRIVATE BASE STATION

(75) Inventors: Volker Breuer, Bötow (DE); Joerg Gustrau, Ulm (DE); Meik Kottkamp, München (DE); Demian Martos-Riano, Berlin (DE); Thomas Ulrich, Bad Dürkheim (DE); Alexander Vesely, Feldbach (AT)

(73) Assignee: Nokia Solutions and Networks Oy, Espoo (FI)

( * ) Notice: Subject to any disclaimer, the term of this patent is extended or adjusted under 35 U.S.C. 154(b) by 906 days.

(21) Appl. No.: 12/665,471

(22) PCT Filed: Jun. 18, 2008

(86) PCT No.: PCT/EP2008/057682
§ 371 (c)(1),
(2), (4) Date: Dec. 18, 2009

(87) PCT Pub. No.: WO2008/155347
PCT Pub. Date: Dec. 24, 2008

(65) Prior Publication Data
US 2010/0197320 A1   Aug. 5, 2010

(30) Foreign Application Priority Data
Jun. 20, 2007   (FI) .................................. 20075469

(51) Int. Cl.
*H04W 48/16*   (2009.01)
*H04W 8/18*    (2009.01)
*H04W 84/10*   (2009.01)

(52) U.S. Cl.
CPC .............. *H04W 48/16* (2013.01); *H04W 8/183* (2013.01); *H04W 84/105* (2013.01)

(58) Field of Classification Search
CPC ... H04W 84/045; H04W 24/02; H04W 64/00; H04W 24/10; H04W 48/16; H04W 48/08; H04W 88/08; H04W 48/20; H04W 36/08; H04W 12/08; H04W 12/06; H04W 84/12; H04W 16/32; H04W 72/1231; H04W 84/10
USPC ............ 455/404.2, 414.2, 422.1, 432.1, 440, 455/456.1, 456.2, 456.3, 456.5, 456.6
See application file for complete search history.

(56) References Cited

U.S. PATENT DOCUMENTS

| | | | |
|---|---|---|---|
| 6,529,491 B1 | 3/2003 | Chang et al. | 370/335 |
| 2003/0007470 A1* | 1/2003 | Grilli et al. | 370/335 |
| 2006/0089138 A1* | 4/2006 | Smith et al. | 455/426.1 |
| 2006/0121916 A1 | 6/2006 | Aborn et al. | 455/456.5 |
| 2008/0058017 A1* | 3/2008 | Carter et al. | 455/561 |
| 2008/0085699 A1* | 4/2008 | Hirano et al. | 455/414.2 |
| 2010/0062792 A1* | 3/2010 | Han et al. | 455/456.2 |

FOREIGN PATENT DOCUMENTS

| | | |
|---|---|---|
| WO | WO 00/49818 | 8/2000 |
| WO | WO 02/093955 A1 | 11/2002 |

* cited by examiner

*Primary Examiner* — Dinh P Nguyen
(74) *Attorney, Agent, or Firm* — Harrington & Smith (57) ABSTRACT

A user terminal receives at least one signal with information depending on a location of the user terminal. The user terminal processes the at least one signal for providing data related to the location while it is in a cell of an accessible private base station and saves the data as a reference data. After that, the user terminal receives at least one signal with information depending on the location of the user terminal and a broadcast from a private base station. The user terminal processes the at least one signal for providing data related to a location of the user terminal and compares the data and a reference data with each other. The controller enables a contact to the private base station if the data and the reference data match each other and, otherwise, disables a contact to the private base station.

50 Claims, 5 Drawing Sheets

ACCESSIBILITY OF PRIVATE BASE STATION

FIELD

The invention relates to the accessibility of a private base station residing in a radio system which includes public base stations.

BACKGROUND

Existing radio systems (GSM, Global System for Mobile Communications; WCDMA/HSDPA, Wide-band Code Division Multiple Access/High Speed Downlink Packet Access) are not optimally suited for, for example, downloading movies from the Internet since they have been developed and defined under the assumption of a coordinated network deployment.

To alleviate the problem, a user can acquire a private base station for his/her own disposal. The private base stations are typically associated with uncoordinated and large-scale deployment. A private base station may be called with many names, such as Home Base Station, Home NodeB, femto eNodeBs or simply Home Access, and it has become a popular topic within the operator and manufacturer community.

It can be assumed that the end-user buys an economic private base station and installs the physical entity at his home. The private base station then provides coverage and service to the user equipment registered by the owner of the private base station. Still, the private base station may use the same spectrum as the radio system. The private base station may be connected via a DSL (Digital Subscriber Line) and via the core network of the operator towards the Internet. Some local breakout scenarios bypassing the core network of the operator may also exist. In any case the consumed services of the owner of a private base station do not eat up capacity of the radio system.

A major requirement for private base stations is that the system supports efficient mechanisms to restrict access to a private base station unless user equipment have access rights to communicate with a specific private base station. Correspondingly, user equipment should not unnecessarily attempt to camp on a cell of a private base station if they do not have access rights.

User equipment is able to extend its list of the private base station it has access to. In UMTS (Universal Mobile Telecommunications System), access to regionally restricted areas are handled via a list of "forbidden Location Areas for roaming" and a list of "forbidden location areas for regional provision of service". These lists in the user equipment are erased when the user equipment is switched off or when the SIM/USIM (Subscriber Identity Module/Universal SIM) is removed, and even regularly in a period of 12/24 hours, for instance. A new entry—corresponding to the LAI (Location Area Identification) received on the broadcast channel—can be added to one of those lists. For LTE/SAE (Long Term Evolution/System Architecture Evolution), a similar list can be defined for Tracking Areas and can be stored in the user equipment. A similar list does exist for PLMNs (Public Land Mobile Network) as well.

In general, concepts relying on NAS (Non-Access-Stratum) procedures can generate a lot of signaling between private base stations, user equipment and the core network, as user equipment need to learn about their restrictions once they attempt to contact a private base station. Given the limitation of user equipment to store lots of forbidden LAIs, it might well happen that user equipment on a daily trip through a city erases its forbidden LAI list several times and hence generates the necessity to contact the network in vain on daily (or shorter) basis, introducing unnecessary power consumption and battery drain, etc.

Initiated NAS procedures generate signaling, which increases interference and should thus be avoided. The NAS procedures may also cause security problems, if for instance intermediate gateways, which serve the private base stations and which do not have security keys of the user equipment available, request the user equipment to authenticate itself with permanent user equipment identifications like IMSI (International Mobile Subscriber Identity) or IMEI (International Mobile Equipment Identity).

BRIEF DESCRIPTION OF THE INVENTION

An object of the invention is to provide an improved solution. According to an aspect of the invention, there is provided a method comprising: receiving, in a user terminal, at least one signal with information depending on a location of the user terminal; processing, in the user terminal, the at least one signal for providing data related to the location while the user terminal is in a cell of a private base station; saving, in the user terminal, the data related to the location as a reference data of the accessible private base station.

According to another aspect of the invention, there is provided a method comprising: receiving, in a user terminal, at least one signal with information depending on a location of the user terminal; receiving, in a user terminal, a broadcast signal from a private base station; processing, in a user terminal, the at least one signal with information depending on a location for providing a data related to a location of the user terminal; comparing, in a user terminal, the data related to the location and a reference data with each other; enabling, by a user terminal, an attempt to contact the private base station if the data related to the location and the reference data match each other and, otherwise, disabling an attempt to contact the private base station.

According to another aspect of the invention, there is provided a user terminal comprising a receiver configured to receive at least one signal with information depending on a location of the user terminal; a controller configured to process the at least one signal for providing a data related to the location while the user terminal is in a cell of an accessible private base station; a memory configured to store the data as a reference data related to the location of the accessible private base station.

According to another aspect of the invention, there is provided a user terminal comprising a receiver configured to receive at least one signal with information depending on a location of the user terminal and a broadcast signal from a private base station; and a controller configured to process the received signal for providing data related to a location of the user terminal, to compare the data related to the location and a reference data with each other, to enable an attempt to contact the private base station if the data related to the location and the reference data match each other and, otherwise, to disable an attempt to contact the private base station.

According to another aspect of the invention, there is provided a radio system comprising public base stations, private base stations and user terminals; a user terminal comprising a receiver configured to receive at least one signal with information depending on a location of the user terminal; a controller configured to process the at least one signal for providing data related to the location while the user terminal is in a cell of an accessible private base station; a memory configured to store the data as a reference data related to the location of the accessible private base station.

According to another aspect of the invention, there is provided a radio system comprising public base stations, private base stations and user terminals; a user terminal comprising a receiver configured to receive at least one signal with information depending on a location of the user terminal and a pilot signal from a private base station; and a controller configured to process the received signal for providing data related to a location of the user terminal, to compare the data related to the location and a reference data with each other, to enable an attempt to contact the private base station if the data related to the location and the reference data match each other and, otherwise, to disable an attempt to contact the private base station.

According to another aspect of the invention, there is provided a computer program product encoding a computer program of instructions for executing a computer process, the process comprising: receiving at least one signal with information depending on a location of the user terminal; processing the at least one signal for providing data related to the location while the user terminal is in a cell of a private base station; saving the data related to the location as a reference data of the accessible private base station.

According to another aspect of the invention, there is provided a computer program distribution medium readable by a computer and encoding a computer program of instructions for executing a computer process, the process comprising: user terminal; processing the at least one signal for providing data related to the location while the user terminal is in a cell of a private base station; saving the data related to the location as a reference data of the accessible private base station.

According to another aspect of the invention, there is provided a computer program product encoding a computer program of instructions for executing a computer process, the process comprising: receiving at least one signal with information depending on a location of the user terminal; receiving a broadcast signal from a private base station; processing the at least one signal with information depending on a location for providing a data related to a location of the user terminal; comparing the data related to the location and a reference data with each other; enabling an attempt to contact the private base station if the data related to the location and the reference data match each other and, otherwise, disabling an attempt to contact the private base station.

According to another aspect of the invention, there is provided a computer program distribution medium readable by a computer and encoding a computer program of instructions for executing a computer process, the process comprising: receiving at least one signal with information depending on a location of the user terminal; receiving a broadcast signal from a private base station; processing the at least one signal with information depending on a location for providing a data related to a location of the user terminal; comparing the data related to the location and a reference data with each other; enabling an attempt to contact the private base station if the data related to the location and the reference data match each other, and otherwise, disabling an attempt to contact the private base station.

According to another aspect of the invention, there is provided a user terminal comprising means for receiving at least one signal with information depending on a location of the user terminal; means for processing the at least one signal for providing data related to the location while the user terminal is in a cell of a private base station; and means for saving the data related to the location as a reference data of the accessible private base station.

According to another aspect of the invention, there is provided a user terminal comprising means for receiving, in a user terminal, at least one signal with information depending on a location of the user terminal; means for receiving, in a user terminal, a broadcast signal from a private base station; means for processing, in a user terminal, the at least one signal with information depending on a location for providing a data related to a location of the user terminal, for comparing the data related to the location and a reference data with each other, for enabling an attempt to contact the private base station if the data related to the location and the reference data match each other and, otherwise, for disabling an attempt to contact the private base station.

According to another aspect of the invention, there is provided a radio system comprising public base stations, private base stations and user terminals; a user terminal comprising means for receiving at least one signal with information depending on a location of the user terminal; means for processing the at least one signal for providing data related to the location while the user terminal is in a cell of a private base station; and means for saving the data related to the location as a reference data of the accessible private base station.

According to another aspect of the invention, there is provided a radio system comprising public base stations, private base stations and user terminals; a user terminal comprising means for receiving, in a user terminal, at least one signal with information depending on a location of the user terminal; means for receiving, in a user terminal, a broadcast signal from a private base station; means for processing, in a user terminal, the at least one signal with information depending on a location for providing a data related to a location of the user terminal, for comparing the data related to the location and a reference data with each other, for enabling an attempt to contact the private base station if the data related to the location and the reference data match each other and, otherwise, for disabling an attempt to contact the private base station.

The invention provides several advantages. The signaling related to NAS procedures can be avoided. That eliminates interfering contacts with the core network and the decreased signaling results in a reduction of energy consumption of a battery in user equipment and interference in the radio system.

LIST OF DRAWINGS

In the following, the invention will be described in greater detail with reference to the embodiments and the accompanying drawings, in which.

DESCRIPTION OF EMBODIMENTS

Figure 1:
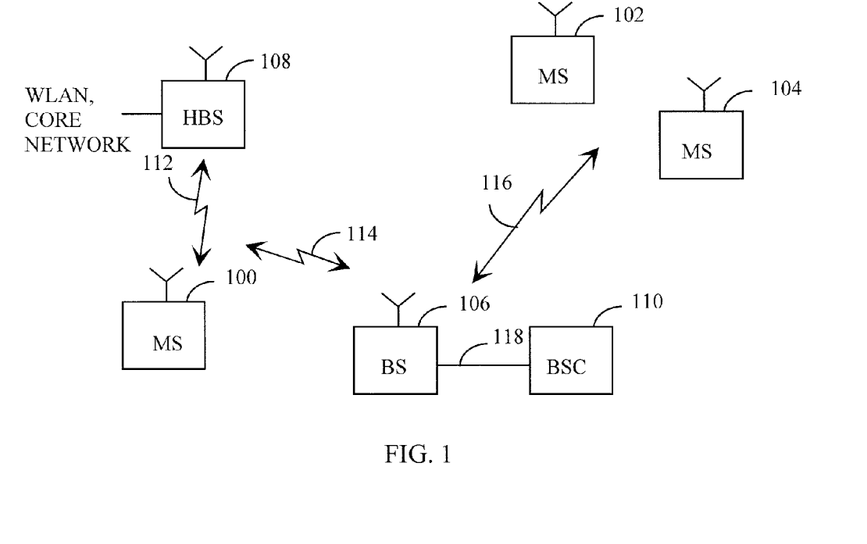
FIG. 1 shows a radio system.

First, the radio system is described by means of FIG. 1. A digital radio system may comprise user equipment 100 to 104, at least one base station 106 to 108, and a base station controller 110, which can also be called a radio network controller. The user equipment 100 to 104, which may also be called user terminals, may communicate with the base stations 106 to 108 using signals 112 to 116. A public base station 106 may have a connection to the base station controller 110 over a digital transmission link 118. A private base station 108 may not necessarily be part of the radio system although it may have a connection to the core network, such as the base station controller 110. The private base station 108 may be connected to WLAN (Wireless Local Area Network), for example, and utilize the Internet. The signals 112 to 116 between the user terminals 100 to 104 and the base stations 106 to 108 carry digitized information, which is traffic data or control data, for example.

The radio system may be based on GERAN (GSM/EDGE RAN, where EDGE stands for Enhanced Data rates for Global Evolution and RAN stands for Radio Access Network), UTRAN (UMTS Terrestrial RAN) or LTE network elements, without being limited to them. The radio system may also utilize HSDPA, HSUPA (High Speed Uplink Packet Access), WiFi (known as wireless fidelity) and WIMAX (Worldwide Interoperability for Microwave Access).

While GSM and UTRAN are well known technologies as such, LTE is a new technology and is based on OFDM (Orthogonal Frequency Division Multiplex) modulation format, MIMO (Multiple Input Multiple Output) antenna technology and SAE features which are known per se.

Each base station 106 to 108, both private and public, broadcast a signal 112 to 116 which may be a pilot signal such that a user terminal 100 to 104 can detect a potential base station to serve the user terminal 100 to 104. Based on the pilot signals, the user terminal selects a base station with which to start communication when switched on or to which to perform a handoff during normal operation. All the public base stations 106 are typically meant to serve and communicate with the user terminal 100 to 104 but not all private base stations 108 are meant to serve or communicate with the user terminal 100 to 104. A few scrambling codes of pilot signals may be reserved for a large number of private base stations. Hence, a certain scrambling code does not properly identify a private base station.

Each public base station 106 broadcasts a signal 112 to 116 with information depending on the location of the base station. Hence, when the user terminal 100 to 104 is traveling from one location to another in the radio system, the user terminal 100 receiving the broadcast signals all the time will detect the change in the information depending on its location. That is, the information depending on the location of the public base station 106 can be used to determine the location of the user terminal 100 since the user terminal 100 has to be near enough a public base station to receive the broadcast.

Figure 2:
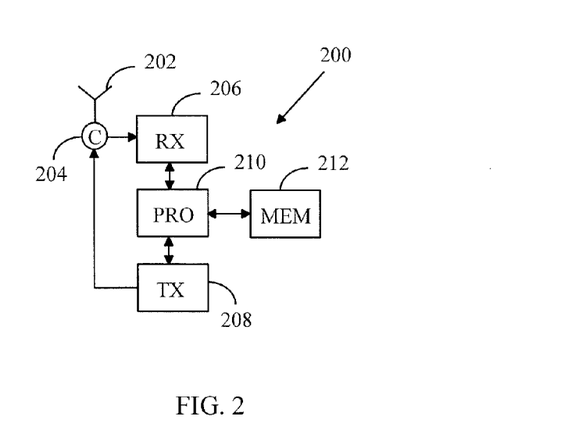
FIG. 2 illustrates a user terminal.

A user terminal 200 is described in FIG. 2. The user terminal includes an antenna 202, an isolator 204, a receiver 206, a transmitter 208, a controller 210 and a memory 212. The isolator 204 may be, for example, a circulator, to separate the receiver 206 and the transmitter 208.

The user terminal 200 can transmit a signal such that a digital signal processed by the controller 210 is fed to the transmitter 208 for mixing the baseband signal up to a radio frequency signal which is guided to the antenna 202 by the isolator 204 to be transmitted as electromagnetic radiation.

A radio frequency electromagnetic signal hitting the antenna 202, in turn, propagates through the isolator 204 to the receiver 206 which mixes the radio frequency signal down to a baseband signal, filters the analog signal and ND-converts the signal to a digital form. To process the received signal, the receiver 206 forwards the baseband signal to the controller 210. The digital signal may be filtered and the data in the signal may be digitally processed. The controller 210 may save the data obtained from the pieces of analog and/or digital information of the received signal in a memory 212. The pieces of information may relate to the location of a public base station or directly to the location of the user terminal 200.

Figure 3A:
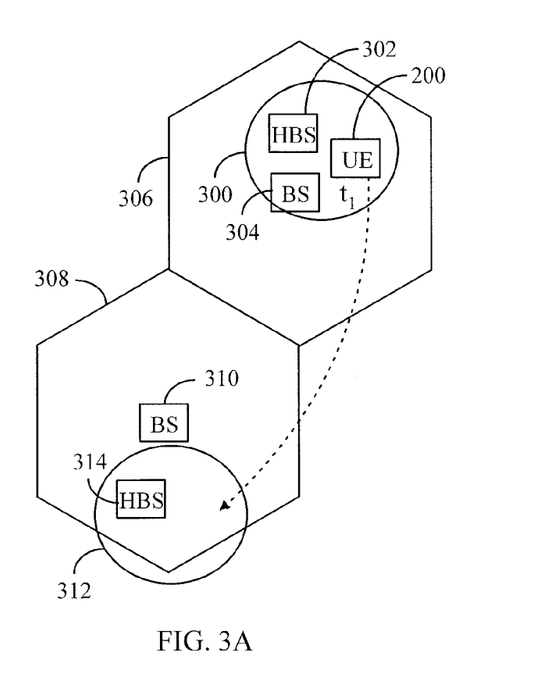
FIG. 3A illustrates saving a piece of information on an accessible private base station.

FIG. 3A presents a situation where a user terminal 200 is in a cell 300 of a private base station 302 at a certain moment $t_1$. The user terminal 200 is assumed to move along the dashed line. In a radio system among a plurality of private base stations, a user terminal may first define and/or record data of an accessible private base station or stations to be later able to select and/or find the proper private base station with which communication is possible. The cell 300 is defined by a coverage area of a private base station 302 which is in this example accessible by the user terminal 200. A cell can be defined as a subdivision of the whole area of a radio system where each subdivision, i.e. cell, has a transceiver as a base station. At the same moment $t_1$, the user terminal 200 may be in a cell 306 defined by the coverage area of a public base station 304. While in the cell 300 of the private base station 302, the user terminal 200 can access and communicate with the private base station 302 if the private base station 302 belongs to the user of the user terminal 200, i.e. the user terminal 200 has a right to access the private base station 302. The accessible private base station 200 may be an access point base station and it may also be called a home base station, a home node B, a femtocell, an(/a femto) eNode B or simply a home access. The eNode B refers to a base station with SAE features. A user terminal may have one or more private base stations at its disposal.

In an embodiment, a receiver 206 of a user terminal 200 may receive at least one signal with information depending on the location of the user terminal 200 at moment $t_1$. The at least one signal may come from at least one public base station 304 broadcasting the signal(s). The controller 210 of the user terminal 200 may process the at least one signal for providing data related to the location of the user terminal 200. The controller 210 may process the signal(s), for example, at a moment $t_1$ when the user terminal 200 is in the cell of the private base station 302. The controller 210 saves the obtained data related to the location of the user terminal 200 in the memory 212 as reference data related to the location of the accessible private base station 302. The data define characteristic information on the accessible base station.

The data related to the location of the user terminal 200 may be based on at least one of the following: CI (Cell Identification), LAI (Location Area Identification), RAI (Routing Area Identification), TAI (Tracking Area Identification), distance between the user terminal and the public base station or OTD (Observed Time Difference) measured by the user terminal.

The at least one signal with information depending on the location of the user terminal 200 may alternatively or additionally come from a satellite positioning system and the data related to the location of the user terminal 200 may be based on a geodetic position of the user terminal 200 on the planet.

The location of the user terminal 200 may be defined as an area smaller than a cell to a plurality of cells of the radio system. In the example of FIG. 3A, the area may comprise the cell 306 defined by the coverage of the public base station 304.

Figure 3B:
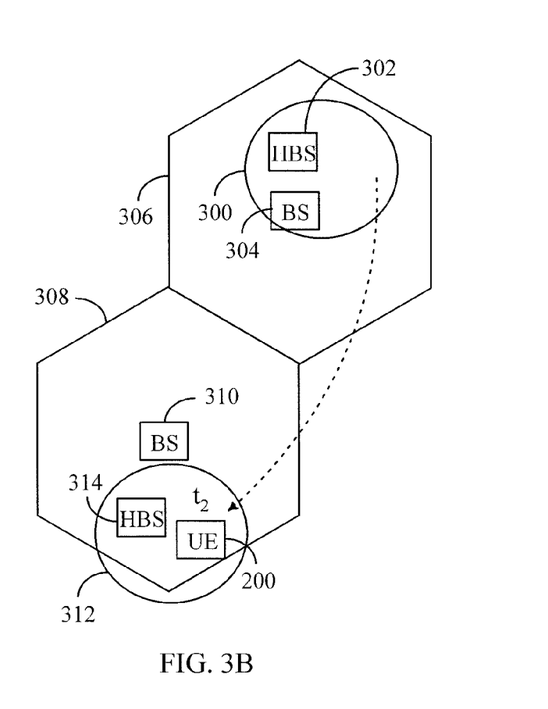
FIG. 3B illustrates a determination whether a private base station is an accessible private base station or not.

FIG. 3B presents a situation where the user terminal 200 has moved or is moving along the dashed line. While in motion, the user terminal 200 may have entered a cell 308 of a public base station 310. The user terminal in the cell 308 may have also entered a cell 312 of a private base station 314 at a moment $t_2$. The private base station 314 in this example is not accessible by the user terminal 200. As both base stations 310, 314 broadcast pilot signals, the user terminal 200 recognizes the base stations 310, 314. When the user terminal 200 is close to the private base station 314 the user terminal 200 may attempt to contact the private base station 314 in accordance with the prior art. As the private base station 314 does not belong to (the user of) the user terminal 200, the attempt is in vain and results in interference and unnecessary consumption of the battery of the user terminal 200 with a possibility of draining the battery.

In an embodiment, a receiver 206 the user terminal 200 may receive at least one signal with information depending on the location of the user terminal 200 at moment $t_2$. The signal(s) may come from the public base station 310 which is transmitting some information about itself with respect to the radio system and hence defining a piece of information on the location for any receiver within its coverage. In general, the signals may come from more than one base station. The controller 210 of the user terminal 200 may process the at least one signal for providing data related to the location of the user terminal 200. The controller 210 of the user terminal 200 may also compare the reference data and the data related to the location of the user terminal. If the reference data and the data related to the location of the user terminal match, the user terminal may be enabled to have a connection with the private base station. Otherwise, the connection is disabled.

The location of a user terminal can be regularly or irregularly updated. A periodic update may be repeated after a predetermined interval. An irregular update may be performed when the user terminal is switched on or when the user terminal performs a handoff. Each time an update is performed, the user terminal locates itself among a group of cells, the group including at least one cell. Since the group of cells covers only a fraction of the geographical area covered by the whole radio system, the location of the user terminal in the radio system can be determined rather well.

The public base station 314 may broadcast at least one signal including CI of a public base station 310. CI defines a cell where the user terminal is, and CI can be updated every time the user terminal is switched on and connects to a base station. CI can also be updated when the user terminal performs a handoff to a new base station and detects that the CI of the new base station is different from that of the previous base station. The controller 210 of the user terminal 200 may determine the data related to the location of the user terminal 200 based on CI. Since CI is usually related to a single public base station only, the resolution of the location of a user terminal is one cell.

The reference data may be CI of the public base station 304. Because CI of the public base station 310 is different from the reference data, the controller 210 makes the user terminal 200 avoid an attempt to contact any private base station when the user terminal 200 is in the coverage 308 of the public base station 310. When CI of a public base station matches the reference data, the controller 210 may make it allowable for the user terminal 200 to attempt to contact a private base station since it can be assumed that the user terminal 200 is actually at a location close to the accessible private base station 302.

The public base station 314 may broadcast at least one signal including LAI of a public base station 310. LAI can be updated every time a user terminal 200 is switched on and connects to a base station. LAI can also be updated when a user terminal performs a handoff to a new base station and observes that the LAI of the new base station is different from that of the previous base station. LAI comprises LAC (Location Area Code) and defines a group of cells with the same LAI, the group including at least one cell. The controller 210 of the user terminal 200 may determine the data related to the location of the user terminal 200 based on LAI. Since LAI is usually related to a plurality of neighboring public base stations, the resolution of the location of a user terminal is the area of the cells of the neighboring public base stations.

The reference data may be LAI of the public base station 304. If LAI of the public base station 310 is different from the reference data, the controller 210 makes the user terminal 200 avoid an attempt to contact the private base station 314. If LAI of the public base station 310 matches the reference data, the controller 210 may enable the user terminal 200 to attempt to contact the private base station 314.

Similarly, the public base station 314 may broadcast at least one signal including RAI of a public base station 310. A routing area can be considered a section of a location area and the term is often used in a packet-switched mode, such as GPRS (General Packet Radio Services). A routing area defines a group of cells with the same RAI, the group including at least one cell. RAI includes several codes such as MCC (Mobile Country Code), MNC (Mobile Network Code), LAC, and RAC (Routing Area Code). MCC defines the country of the radio system and MNC defines the operator of the radio system.

The controller 210 of the user terminal 200 may determine the data related to the location of the user terminal 200 based on RAI. The reference data may be RAI of the public base station 304. If RAI of the public base station 310 is different from the reference data, the controller 210 makes the user terminal 200 avoid an attempt to contact the private base station 314. If RAI of the public base station 310 matches the reference data, the controller 210 may make it allowable for the user terminal 200 to attempt to contact the private base station 314.

Similarly, the public base station 314 may broadcast at least one signal including TAI of a public base station 310. A term tracking area is often used in an LTE radio system. A tracking area defines a group of cells with the same TAI, the group including at least one cell.

The controller 210 of the user terminal 200 may determine the data related to the location of the user terminal 200 based on TAI. The reference data may be TAI of the public base station 304. If TAI of the public base station 310 is different from the reference data, the controller 210 makes the user terminal 200 to avoid an attempt to contact the private base station 314. If TAI of the public base station 310 matches the reference data, the controller 210 may make it allowable for the user terminal 200 to attempt to contact the private base station 314.

Figure 4:
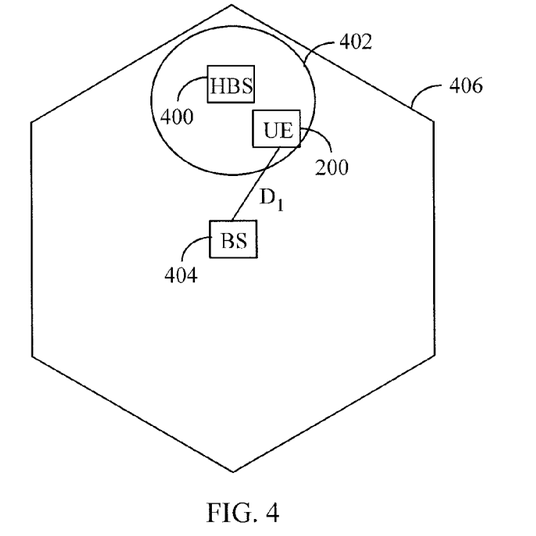
FIG. 4 illustrates measurements of distances of a private base station with respect to a user terminal and a public base station.

FIG. 4 represents a distance measurement. When a user terminal 200 is in a cell 402 of a private base station 400, the data related to the location of the user terminal 200 can be determined as a distance $D_1$ between the user terminal 200 and the public base station 404 under whose coverage i.e. cell 406 the private base station 400 is. The controller 210 of the user terminal can measure the distance $D_1$ on the basis of the propagation delay of a signal or signals transmitted by the public base station 404. When the distance $D_1$ is known, the controller 210 of the user terminal 200 can determine the data related to the location of the user terminal as the distance $D_1$.

The reference data may be based on the distance $D_1$ of the public base station in whose cell the accessible private base station resides. If the distance $D_1$ of the public base station 404 is different from the reference data, the controller 210 makes the user terminal 200 to avoid an attempt to contact the private base station 400. If the distance $D_1$ of the public base station 404 matches the reference data, the controller 210 may make it allowable for the user terminal 200 to attempt to contact the private base station 400.

The location accuracy can be increased and the probability of NAS can be decreased by measuring distances to at least two public base stations. A theoretical optimum can be reached with signals from three separate public base stations (trilateration or triangulation) whose use is often adequate to define an unambiguous subcell area in a cell where the user terminal has to reside to be able to access the private base station.

Assuming that the base stations transmit synchronously, OTD at reception of the signals, which arrive from two base stations, corresponds to the distances of the base stations, i.e. OTD equals to GTD (Geometrical Time Difference). Deviations from synchronicity may also be taken into account.

In an embodiment, OTD can be measured when a user terminal 200 receives at least one signal from a public base station 404 and at least one signal from a private base station 400. As the signals carry information on their propagation delay which depend on the location of the user terminal 200, their OTD can be determined by a SFN-SFN (System Frame Number) type 1 or type 2 measurement. The SFN-SFN type 1 measurement determines frame-level timing and chip-level timing of the signals received from different base stations. As to frame-level timing, the user terminal 200 determines the deviations between the frame numbers of the signals. The chip-level timing, in turn, depends on timing of sequences of descrambling pseudo-noise used for the signals. In the SFN-SFN type 2 measurement, the user terminal 200 measures chip-level timing of the signals received from different base stations.

The controller 210 of the user terminal 400 may measure OTD between a public base station 404 and a private base station 400, the private base station 400 being in the coverage of the public base station 404. The user terminal 400 may determine data related to the location of the user terminal 200 based on OTD between the public base station 404 and the private base station 400.

The reference data may be based on OTD of the public base station in whose cell the accessible private base station resides. If OTD of the public base station 404 is different from the reference data, the controller 210 makes the user terminal 200 avoid an attempt to contact the private base station 400. If OTD of the public base station 404 matches with the reference data, the controller 210 enables the user terminal 200 to attempt to contact the private base station 400.

The public base station in whose cell the accessible private base station resides may have a known location with respect to the accessible private base station and the known location may also be stored as part of the reference data in the memory 212 of the user terminal 200. In that case, both OTD and a location of a just detected public base station can be compared with the reference data in order to check whether a private base station which resides in a cell of the just detected public base station is accessible.

Figure 5:
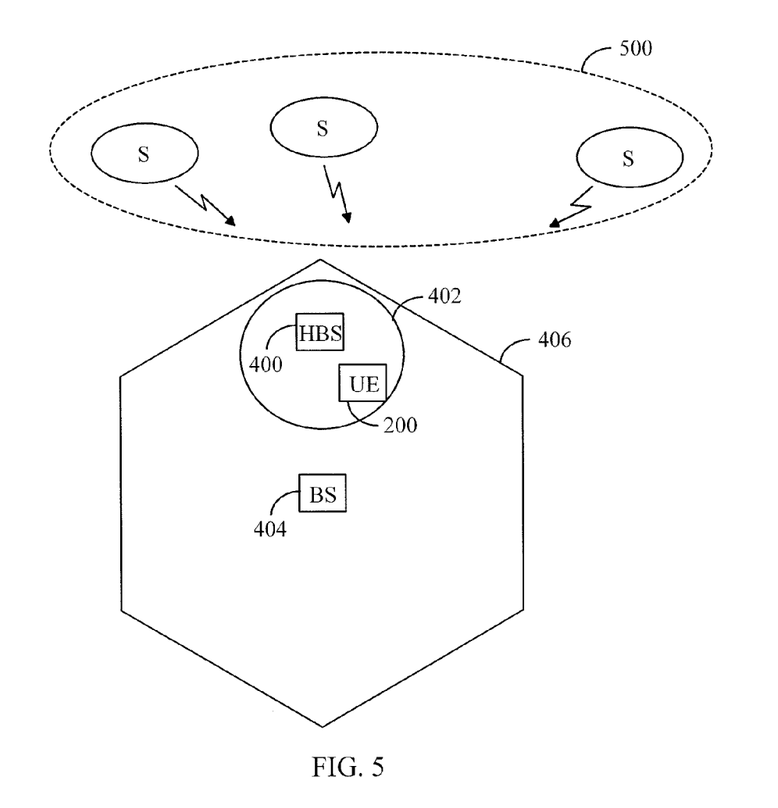
FIG. 5 illustrates a satellite positioning system.

FIG. 5 represents the use of a satellite positioning system. The satellite system may be GNSS (Global Navigation Satellite System) or Galileo, for instance. The user terminal 200 receives signals from a satellite positioning system 500. The controller of the user terminal 200 may process the signals to provide the location of the user terminal 200 as a geodetic position on earth. The reference data stored in the memory 210 of the user terminal 200 may be based on the geodetic position determined during the time the user terminal 200 resides in the cell of an accessible private base station. The cell 406 of the public base station 404 is not necessarily needed in this embodiment.

If the data based on the geodetic position of the user terminal is different from the reference data while the user terminal is traveling in the radio system, the controller 210 makes the user terminal 200 avoid an attempt to contact any private base station. If the geodetic position of the user terminal 200 matches with the reference data, the controller 210 enables the user terminal 200 to attempt to contact a private base station.

Instead of using one method, it is possible to combine the methods described above for determining the reference data and the data related to the location of the user terminal.

Figure 6:
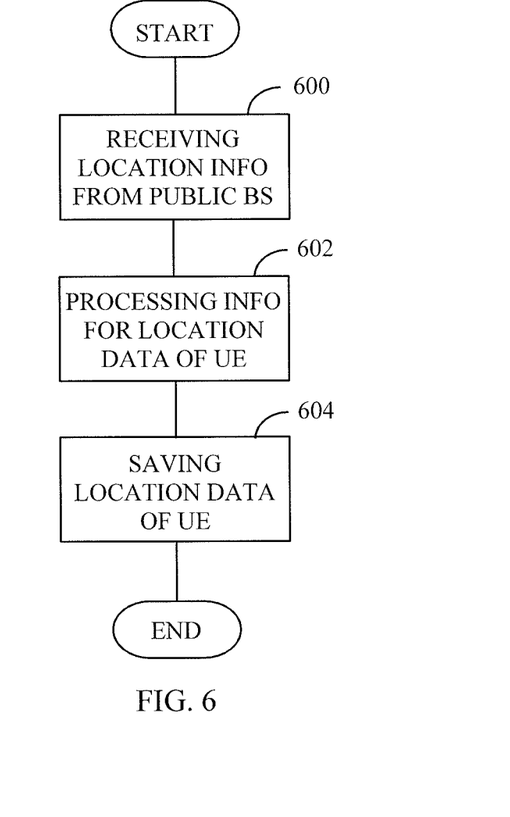
FIG. 6 illustrates a flowchart of a method of saving a piece of information on an accessible private base station.

FIG. 6 presents a flowchart of a method of saving a piece of information on the location of the user terminal with respect to a public base station or a geodetic position on earth while the user terminal is in a cell of an accessible private base station. In step 600, the user terminal receives at least one signal with information depending on the location of the user terminal. In step 602, the user terminal processes the at least one signal for providing data related to the location while the user terminal is in a cell of a private base station. In step 604, the user terminal saves the data related to the location as reference data of the accessible private base station.

Figure 7:
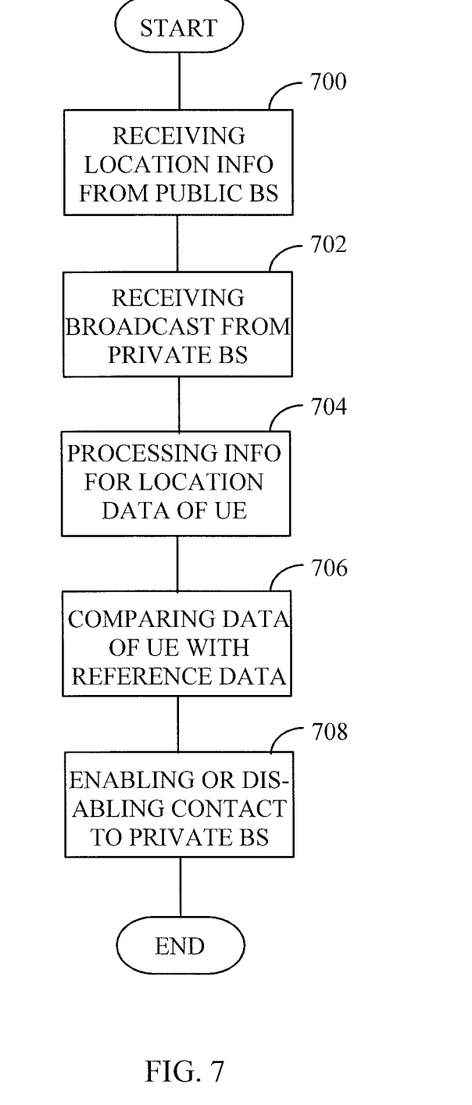
FIG. 7 illustrates a flowchart of a method of determining whether a private base station is an accessible private base station or not.

FIG. 7 presents a flowchart of a method of determining whether a private base station can be selected as an accessible base station or not. In step 700, a user terminal receives at least one signal with information depending on the location of the user terminal. In step 702, the user terminal receives a broadcast signal from a private base station. In step 704, the user terminal processes the at least one signal with information depending on the location for providing data related to the location of the user terminal. In step 706, the user terminal compares the data related to the location and reference data with each other. In step 708, the user terminal enables an attempt to contact the private base station if the data related to the location and the reference data match each other, and otherwise, disables an attempt to contact the private base station.

The controller may be configured to perform at least some of the steps described in connection with the flowcharts of FIGS. 6 and 7. The embodiments may be implemented as a computer program comprising instructions for executing a computer process. The computer program may be in a source code form, object code form, or in some intermediate form, and it may be stored in some sort of carrier which may be any entity or device capable of carrying the program. Such carriers include a record memory, computer memory, read-only memory, electrical carrier signal, telecommunications signal, and a software distribution package, for example. Depending on the processing power needed, the computer program may be executed in a single electronic digital computer or it may be distributed amongst a number of computers.

In addition to or instead of the computer program, the embodiments may be implemented at least partly as one or more integrated circuits, such as ASIC (Application-Specific Integrated Circuits). Other hardware embodiments are also possible, such as a circuit built of separate logic components. A hybrid of these different implementations is also feasible.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the embodiments have been described above with reference to an example according to the accompanying drawings, it is clear that the invention is not restricted thereto but can be modified in several ways within the scope of the appended claims.

The invention claimed is:

1. A method, comprising:
receiving, in a user terminal, at least one signal from a public base station and at least one signal from a private base station, each of the signals carrying information pertaining to propagation delay depending on a location of the user terminal;
processing, in the user terminal, the at least one signal from the public base station and the at least one signal from the private base station for providing data as a system frame number measurement related to the location while the user terminal is in a cell of a private base station; and
saving, in the user terminal, the data related to the location as a reference data of an accessible private base station;
wherein the system frame number measurement determines an observed time difference using chip-level timing that depends on a timing of sequences of descrambling pseudo-noise used for each of the signals; and
wherein the observed time difference using chip-level timing that depends on a timing of sequences of descrambling pseudo-noise used for each of the signals is compared to a known location of the public base station to check whether the private base station resides in a cell of the public base station.

2. The method of claim 1, the method comprising receiving the at least one signal from the public base station of a radio system; and processing the at least one signal for providing the data so that the data represents an area comprising at least one cell of the radio system.

3. The method of claim 1, the method comprising receiving the at least one signal from the public base station of a radio system; and processing the at least one signal for providing the data so that the data represents a subcell area in a cell of the radio system.

4. The method of claim 1, the method comprising receiving the at least one signal from the public base station or the at least one signal from the private base station from a satellite positioning system; and processing the at least one signal for providing the data so that the data represents a geodetic position on earth.

5. A method, comprising:
receiving, in a user terminal, at least one signal with information depending on a location of the user terminal;
receiving, in a user terminal, a broadcast signal from a private base station;
processing, in a user terminal, the at least one signal with information depending on the location for providing data related to the location of the user terminal;
comparing, in a user terminal, the data related to the location and a reference data with each other; and
enabling an attempt to contact, by the user terminal, the private base station if the data related to the location and the reference data match each other and, otherwise, disabling an attempt to contact the private base station;
receiving the at least one signal from at least one public base station of a radio system; and processing the at least one signal for providing the data related to the location so that the location represents an area comprising at least one cell of the radio system;
measuring an observed time difference between a public base station having a known location and a private base station, the private base station being in the coverage of the public base station having a known location; and determining the data related to the location with respect to the private base station on the basis of the observed time difference between the public base station having a known location and the private base station;
wherein the observed time difference is determined by a system frame number measurement using chip-level timing that depends on a timing of sequences of descrambling pseudo-noise used for each of the signals; and
wherein the observed time difference determined by using chip-level timing that depends on a timing of sequences of descrambling pseudo-noise used for each of the signals is compared to the known location of the public base station to check whether the private base station resides in a cell of the public base station.

6. The method of claim 5, the method comprising receiving at least one signal including location area identification of a public base station; and determining the data related to the location on the basis of the location area identification.

7. The method of claim 5, the method comprising receiving at least one signal including routing area identification of a public base station; and determining the data related to the location on the basis of the routing area identification.

8. The method of claim 5, the method comprising receiving at least one signal including tracking area identification of a public base station; and determining the data related to the location on the basis of the tracking area identification.

9. The method of claim 5, the method comprising receiving at least one signal including cell identification of a public base station; and determining the data related to the location on the basis of the cell identification.

10. The method of claim 5, the method comprising measuring a distance between the user terminal and at least one public base station on the basis of the at least one received signal; and determining the data related to the location on the basis of the distance to the at least one public base station.

11. The method of claim 5, the method comprising receiving the at least one signal from at least one public base station of a radio system; and processing the at least one signal for providing the data so that the data represents a subcell in a cell of the radio system.

12. The method of claim 5, the method comprising receiving the at least one signal from a satellite positioning system; and processing the at least one signal for providing the location so that the location represents a geodetic position on the earth.

13. A user terminal, comprising:
a receiver configured to receive at least one signal from a public base station and at least one signal from a private base station, each of the signals carrying information pertaining to propagation delay depending on a location of the user terminal;
a controller configured to process the at least one signal from the public base station and the at least one signal from the private base station for providing data as a system frame number measurement related to the location while the user terminal is in a cell of an accessible private base station; and a memory configured to store the data as a reference data related to the location of an accessible private base station;

wherein the system frame number measurement determines an observed time difference using chip-level timing that depends on a timing of sequences of descrambling pseudo-noise used for each of the signals; and wherein the observed time difference using chip-level timing that depends on a timing of sequences of descrambling pseudo-noise used for each of the signals is compared to a known location of the public base station to check whether the private base station resides in a cell of the public base station.

14. The user terminal of claim 13, wherein the receiver is configured to receive the at least one signal from the at least one public base station of a radio system; and the controller is configured to process the at least one signal for providing the data so that the data represents an area comprising at least one cell of the radio system.

15. The user terminal of claim 13, wherein the receiver is configured to receive the at least one signal from the at least one public base station of a radio system; and the controller is configured to process the at least one signal for providing the data so that the data represents a subcell area in a cell of the radio system.

16. The user terminal of claim 13, wherein the receiver is configured to receive the at least one signal from the public base station or the at least one signal from the private base station from a geodetic positioning satellite system; and the controller is configured to process the at least one signal for providing the data as so that the data represents a geodetic position on the earth.

17. A user terminal, comprising:
a receiver configured to receive at least one signal with information depending on a location of the user terminal and a broadcast signal from a private base station; and
a controller configured
to process the received signal for providing data related to a location of the user terminal,
to compare the data related to the location and a reference data with each other, and
to enable an attempt to contact the private base station if the data related to the location and the reference data match each other and, otherwise, to disable an attempt to contact the private base station;
wherein the receiver is configured to receive the at least one signal from at least one public base station of a radio system; and the controller is configured to process the at least one signal for providing the data related to the location so that the data represents an area comprising at least one cell of the radio system;
wherein the controller is configured to measure an observed time difference between a public base station having a known location and a private base station, the private base station being in the coverage of the public base station having a known location; and the controller is configured to determine the data related to the location with respect to the private base station on the basis of the observed time difference between the public base station having a known location and the private base station; and
wherein the observed time difference is determined by a system frame number measurement using chip-level timing that depends on a timing of sequences of descrambling pseudo-noise for each of the signals from the private base station and the public base station; and wherein the observed time difference determined by using chip-level timing that depends on a timing of sequences of descrambling pseudo-noise used for each of the signals is compared to the known location of the public base station to check whether the private base station resides in a cell of the public base station.

18. The user terminal of claim 17, wherein the receiver is configured to receive the at least one signal from at least one public base station of a radio system; and the controller is configured to process the at least one signal for providing the data so that the data represents an area comprising at least one cell of the radio system.

19. The user terminal of claim 17, wherein the receiver is configured to receive signals from at least two public base stations of a radio system; and the controller is configured to process the signals for providing the data so that the data represents a subcell area in a cell of the radio system.

20. The user terminal of claim 17, wherein the receiver is configured to receive at least one signal including location area identification of a public base station; and the controller is configured to determine the data related to the location on the basis of the location area identification.

21. The user terminal of claim 17, wherein the receiver is configured to receive at least one signal including routing area identification of a public base station; and the controller is configured to determine the data related to the location on the basis of the routing area identification.

22. The user terminal of claim 17, wherein the receiver is configured to receive at least one signal including tracking area identification of a public base station; and the controller is configured to determine the data related to the location on the basis of the tracking area identification.

23. The user terminal of claim 17, wherein the receiver is configured to receive at least one signal including cell identification of a public base station; and the controller is configured to determine the data related to the location on the basis of the cell identification.

24. The user terminal of claim 17, wherein the controller is configured to measure a distance between the user terminal and at least one public base station based on the at least one received signal; and the controller is configured to determine the data related to the location on the basis of the distance to the at least one public base station.

25. The user terminal of claim 17, wherein the receiver is configured to receive the at least one signal from at least one public base station of a radio system; and the controller is configured to process the at least one signal for providing the data so that the data represents a subcell area in a cell of the radio system.

26. The user terminal of claim 17, wherein the receiver is configured to receive the at least one signal from a satellite positioning system; and the controller is configured to process the at least one signal for providing the data so that the data represents a geodetic position on the earth.

27. A radio system comprising public base stations, private base stations, and user terminals, the radio system comprising:
a user terminal comprising,
a receiver configured to receive at least one signal from a public base station and at least one signal from a private base station, each of the signals carrying information pertaining to propagation delay depending on a location of the user terminal;
a controller configured to process the at least one signal from the public base station and the at least one signal from the private base station for providing data as a system frame number measurement related to the location while the user terminal is in a cell of an accessible private base station; and a memory configured to store the data as a reference data related to the location of the accessible private base station;

wherein the system frame number measurement determines an observed time difference using chip-level timing that depends on a timing of sequences of descrambling pseudo-noise used for each of the signals; and wherein the observed time difference using chip-level timing that depends on a timing of sequences of descrambling pseudo-noise used for each of the signals is compared to a known location of the public base station to check whether the private base station resides in a cell of the public base station.

28. The radio system of claim 27, wherein the receiver is configured to receive the at least one signal from the at least one public base station of a radio system; and the controller is configured to process the at least one signal for providing the location so that the location represents an area comprising at least one cell of the radio system.

29. The radio system of claim 27, wherein the receiver is configured to receive signals from at least two public base station of a radio system; and the controller is configured to process the signals for providing the data so that the data represents a subcell area in a cell of the radio system.

30. The radio system of claim 27, wherein the receiver is configured to receive the at least one signal from a satellite positioning system; and the controller is configured to process the at least one signal for providing the data so that the data represents a geodetic position on earth.

31. A radio system comprising public base stations, private base stations, and user terminals, the radio system comprising:

a user terminal comprising, a receiver configured to receive at least one signal with information depending on a location of the user terminal and a pilot signal from a private base station; and a controller configured to process the received signal for providing data related to the location of the user terminal, to compare the data related to the location and a reference data with each other, and to enable an attempt to contact the private base station if the data related to the location and the reference data match each other and, otherwise, to disable an attempt to contact the private base station;

wherein the receiver is configured to receive the at least one signal from at least one public base station of a radio system; and the controller is configured to process the at least one signal for providing the data related to the location so that the data represents an area comprising at least one cell of the radio system; and wherein the controller is configured to measure an observed time difference between a public base station having a known location and a private base station, the private base station being in the coverage of the public base station having a known location; and the controller is configured to determine the data related to the location with respect to the private base station on the basis of the observed time difference between the public base station having a known location and the private base station; and wherein the observed time difference is determined by a system frame number measurement using chip-level timing that depends on a timing of sequences of descrambling pseudo-noise used for each of the signals; and wherein the observed time difference determined by using chip-level timing that depends on a timing of sequences of descrambling pseudo-noise used for each of the signals is compared to the known location of the public base station to check whether the private base station resides in a cell of the public base station.

32. The radio system of claim 31, wherein the receiver is configured to receive the at least one signal from at least one public base station of a radio system; and the controller is configured to process the at least one signal for providing the data so that the data represents an area comprising at least one cell of the radio system.

33. The radio system of claim 31, wherein the receiver is configured to receive signals from at least two public base stations of a radio system; and the controller is configured to process the signals for providing the data so that the data represents a subcell area in a cell of the radio system.

34. The radio system of claim 31, wherein the receiver is configured to receive at least one signal including location area identification of a public base station; and the controller is configured to determine the data related to the location on the basis of the location area identification.

35. The radio system of claim 31, wherein the receiver is configured to receive at least one signal including routing area identification of a public base station; and the controller is configured to determine the data related to the location on the basis of the routing area identification.

36. The radio system of claim 31, wherein the receiver is configured to receive at least one signal including tracking area identification of a public base station; and the controller is configured to determine the data related to the location on the basis of the tracking area identification.

37. The radio system of claim 31, wherein the receiver is configured to receive at least one signal including cell identification of a public base station; and the controller is configured to determine the data related to the location on the basis of the cell identification.

38. The radio system of claim 31, the controller is configured to measure a distance between the user terminal and at least one public base station based on the at least one received signal; and the controller is configured to determine the data related to the location on the basis of the distance to the at least one public base station.

39. The radio system of claim 31, wherein the receiver is configured to receive the at least one signal from at least one public base station of a radio system; and the controller is configured to process the at least one signal for providing the data so that the data represents a subcell area in a cell of the radio system.

40. The radio system of claim 31, wherein the receiver is configured to receive the at least one signal from a satellite positioning system; and the controller is configured to process the at least one signal for providing the data so that the data represents a geodetic position on the earth.

41. A computer program product encoding a computer program of instructions for executing a computer process, by a processor coupled with a memory, the process comprising:

receiving at least one signal from a public base station and at least one signal from a private base station, each of the signals carrying information pertaining to propagation delay depending on a location of the user terminal;

processing the at least one signal from the public base station and the at least one signal from the private base station for providing data as a system frame number measurement related to the location while the user terminal is in a cell of a private base station;

saving the data related to the location as a reference data of an accessible private base station;

wherein the system frame number measurement determines an observed time difference using chip-level timing that depends on a timing of sequences of descrambling pseudo-noise used for each of the signals; and wherein the observed time difference using chip-level timing that depends on a timing of sequences of descrambling pseudo-noise used for each of the signals is compared to a known location of the public base station to check whether the private base station resides in a cell of the public base station.

42. A non-transitory computer readable storage medium tangibly embodying a program of instructions readable by a computer and for executing a computer process, the process comprising:

receiving, in a user terminal, at least one signal from a public base station and at least one signal from a private base station, each of the signals carrying information pertaining to propagation delay depending on a location of the user terminal;

processing the at least one signal from the public base station and the at least one signal from the private base station for providing data as a system frame number measurement related to the location while the user terminal is in a cell of a private base station;

saving the data related to the location as a reference data of an accessible private base station;

wherein the system frame number measurement determines an observed time difference using chip-level timing that depends on a timing of sequences of descrambling pseudo-noise used for each of the signals; and wherein the observed time difference using chip-level timing that depends on a timing of sequences of descrambling pseudo-noise used for each of the signals is compared to a known location of the public base station to check whether the private base station resides in a cell of the public base station.

43. The non-transitory computer readable storage medium of claim 42, the storage medium including at least one of the following media: a computer readable medium, a program storage medium, a record medium, a computer readable memory, a computer readable software distribution package, and a computer readable compressed software package.

44. A computer program product encoding a computer program of instructions for executing a computer process, by a processor coupled with a memory, the process comprising:

receiving at least one signal with information depending on a location of a user terminal;

receiving a broadcast signal from a private base station;

processing the at least one signal with information depending on the location for providing data related to the location of the user terminal;

determining an observed time difference by a system frame number measurement using chip-level timing that depends on a timing of sequences of descrambling pseudo-noise used for each of the at least one signal with information depending on a location of a user terminal and the broadcast signal from the private base station;

comparing the data related to the location and a reference data with each other; and enabling an attempt to contact the private base station if the data related to the location and the reference data match each other and, otherwise, disabling an attempt to contact the private base station; and wherein the observed time difference determined by using chip-level timing that depends on a timing of sequences of descrambling pseudo-noise used for each of the signals is compared to a known location of a public base station to check whether the private base station resides in a cell of the public base station.

45. A non-transitory computer storage medium tangibly embodying a computer program of instructions readable by a computer and for executing a computer process, the process comprising:

receiving at least one signal with information depending on a location of a user terminal;

receiving a broadcast signal from a private base station;

processing the at least one signal with information depending on the location for providing data related to the location of the user terminal;

determining an observed time difference by a system frame number measurement using chip-level timing that depends on a timing of sequences of descrambling pseudo-noise used for each of the at least one signal with information depending on a location of a user terminal and the broadcast signal from the private base station;

comparing the data related to the location and a reference data with each other; and enabling an attempt to contact the private base station if the data related to the location and the reference data match each other and, otherwise, disabling an attempt to contact the private base station; and wherein the observed time difference determined by using chip-level timing that depends on a timing of sequences of descrambling pseudo-noise used for each of the signals is compared to a known location of a public base station to check whether the private base station resides in a cell of the public base station.

46. The non-transitory computer storage medium of claim 45, the storage medium including at least one of the following media: a computer readable medium, a program storage medium, a record medium, a computer readable memory, a computer readable software distribution package, and a computer readable compressed software package.

47. A user terminal, comprising:

means for receiving at least one signal from a public base station and at least one signal from a private base station, each of the signals carrying information pertaining to propagation delay depending on a location of the user terminal;

means for processing the at least one signal from the public base station and the at least one signal from the private base station for providing data as a system frame number measurement related to the location while the user terminal is in a cell of a private base station; and means for saving the data related to the location as a reference data of an accessible private base station;

wherein the system frame number measurement determines an observed time difference using chip-level timing that depends on a timing of sequences of descrambling pseudo-noise used for each of the signals; and wherein the observed time difference using chip-level timing that depends on a timing of sequences of descrambling pseudo-noise used for each of the signals is compared to a known location of the public base station to check whether the private base station resides in a cell of the public base station.

48. A user terminal, comprising:
- means for receiving, in a user terminal, at least one signal with information depending on a location of the user terminal;
- means for receiving, in a user terminal, a broadcast signal from a private base station; and
- means for processing, in a user terminal, the at least one signal with information depending on the location for providing data related to the location of the user terminal, for comparing the data related to the location and a reference data with each other, for enabling an attempt to contact the private base station if the data related to the location and the reference data match each other and, otherwise, for disabling an attempt to contact the private base station;
- wherein an observed time difference is determined by a system frame number measurement using chip-level timing that depends on a timing of sequences of descrambling pseudo-noise used for each of the signals; and
- wherein the observed time difference determined by using chip-level timing that depends on a timing of sequences of descrambling pseudo-noise used for each of the signals is compared to a known location of a public base station to check whether the private base station resides in a cell of the public base station.

49. A radio system comprising public base stations, private base stations, and user terminals, the radio system comprising:
- a user terminal comprising,
  - means for receiving at least one signal from a public base station and at least one signal from a private base station, each of the signals carrying information pertaining to propagation delay depending on a location of the user terminal;
  - means for processing the at least one signal from the public base station and the at least one signal from the private base station for providing data as a system frame number measurement related to the location while the user terminal is in a cell of a private base station; and
  - means for saving the data related to the location as a reference data of an accessible private base station;
- wherein the system frame number measurement determines an observed time difference using chip-level timing that depends on a timing of sequences of descrambling pseudo-noise used for each of the signals; and
- wherein the observed time difference using chip-level timing that depends on a timing of sequences of descrambling pseudo-noise used for each of the signals is compared to a known location of the public base station to check whether the private base station resides in a cell of the public base station.

50. A radio system comprising public base stations, private base stations and user terminals, the radio system comprising:
- a user terminal comprising,
  - means for receiving, in a user terminal, at least one signal with information depending on a location of the user terminal;
  - means for receiving, in a user terminal, a broadcast signal from a private base station; and
  - means for processing, in a user terminal, the at least one signal with information depending on the location for providing data related to the location of the user terminal, for comparing the data related to the location and a reference data with each other, for enabling an attempt to contact the private base station if the data related to the location and the reference data match each other and, otherwise, for disabling an attempt to contact the private base station;
- wherein an observed time difference is determined by a system frame number measurement using chip-level timing that depends on a timing of sequences of descrambling pseudo-noise used for each of the signals; and
- wherein the observed time difference determined by using chip-level timing that depends on a timing of sequences of descrambling pseudo-noise used for each of the signals is compared to a known location of the public base station to check whether the private base station resides in a cell of the public base station.

* * * * *